United States Patent [19]

Julian et al.

[11] Patent Number: 6,108,223

[45] Date of Patent: Aug. 22, 2000

[54] IGBT-CONTROLLED THYRISTOR AC/DC CONVERTER

[75] Inventors: Alexander L. Julian; Giovanna Oriti, both of Vernon, Conn.

[73] Assignee: Otis Elevator Company, Farmington, Conn.

[21] Appl. No.: 09/427,470

[22] Filed: Oct. 26, 1999

[51] Int. Cl.[7] .................................................. H02M 7/155
[52] U.S. Cl. ................................................. 363/78; 363/89
[58] Field of Search ................................... 363/78, 84, 87, 363/88, 89

[56] References Cited

U.S. PATENT DOCUMENTS

| | | | |
|---|---|---|---|
| 3,922,594 | 11/1975 | Brown | 363/101 |
| 3,996,508 | 12/1976 | Board | 323/277 |
| 4,447,868 | 5/1984 | Turnbull | 363/81 |
| 4,449,176 | 5/1984 | Turnbull | 363/81 |
| 5,367,448 | 11/1994 | Carroll | 363/89 |
| 5,784,269 | 7/1998 | Jacobs et al. | 363/89 |
| 5,936,855 | 8/1999 | Salmon | 363/46 |
| 6,031,737 | 2/2000 | Green | 363/37 |

OTHER PUBLICATIONS

J. Salmon, E. Nowicki, W. Xu and D. Koval, "Low distortion 3–phase rectifiers utilizing harmonic correction circuit topologies with both IGBT and thyristor switches", APEC1998, pp. 1100–1106, "No Month".

K. Oguchi and Y. Maki, "A Multilevel–Voltage Source Rectifier with a Three–Phase Diode Bridge Circuit as a Main Power Circuit", IEEE IAS Meet., Conf. Rec. 1992, pp. 695–702.

*Primary Examiner*—Adolf Deneke Berhane

[57] ABSTRACT

A hybrid diode/thyristor AC/DC converter includes a thyristor bridge (21) poled oppositely to a diode bridge (13), current through the thyristor bridge being controlled by IGBTs (30, 31). A thyristor turn-off circuit (40–42, 45–47) is responsive to turn-off of the IGBT to reverse bias the thyristors, thereby causing them to turn off. The thyristors and IGBTs are controlled (50) in response to voltage (55–57) of and current flowing (51–53) in the AC mains so as to cause the current flowing to or from the AC mains to be more nearly sinusoidal. The hybrid bridge handles application of regenerative power to the AC mains.

3 Claims, 3 Drawing Sheets

1

IGBT-CONTROLLED THYRISTOR AC/DC CONVERTER

TECHNICAL FIELD

This invention relates to an AC/DC converter having a three-phase diode bridge with a three-phase thyristor booster bridge which improves the quality of the current waveforms and supports regenerative application of power into the AC mains, the conduction of the thyristors being controlled by insulated gate bipolar transistors (IGBT's).

BACKGROUND ART

An example of an application for an AC/DC converter is generating a DC voltage from three-phase AC power, the DC voltage then being modulated to provide controlled power to a variable speed AC motor, such as are commonly used in elevators and pump/compressor systems. A common AC/DC converter is formed of IGBTs. However, the IGBT devices are themselves very expensive, and the gate drive circuitry to control them is also expensive. In contrast, thyristors cost only one-tenth as much as IGBTs. The simplest and cheapest form of AC/DC converter is illustrated in FIG. 1. Therein, three-phase AC is fed through inductors 12 to a bridge 13 formed of diodes 14. A DC voltage is generated on positive and negative rails 15, 16, respectively, by a large capacitor or capacitor bank 17, and is applied to a load 18, such as a variable frequency, variable voltage DC/AC inverter of a known type. However, such a device has a very poor input current waveform, one phase of which is illustrated along with AC source voltage in FIG. 2. Another problem with diode bridges is that they do not handle returning power to the AC grid during regeneration, such as occurs when an elevator travels downwardly with a heavy load or travels upwardly with a light load.

DISCLOSURE OF INVENTION

Objects of the invention include a low-cost AC/DC converter capable of operation at moderately high power with a high quality input current waveform, and capable of supporting regeneration.

This invention is predicated on the concept that a hybrid AC/DC converter topology may use diodes in the bridge configuration to carry most of the load, and thyristors in the bridge configuration to improve the harmonic content of the input waveform and to support regeneration, utilizing a pair of IGBTs to control the conduction of the thyristors.

According to the present invention, an AC/DC converter comprises a diode bridge, and a thyristor bridge in series with a pair of insulated gate bipolar transistors, the series combination of the thyristor bridge and IGBTs being in parallel with the diode bridge; thyristor turnoff circuits are associated with each IGBT.

The invention provides an input current waveform which is sufficiently sinusoidal to meet quality standards for current established by recommended practices, with low harmonic content, while providing moderately high power, utilizing only a pair of expensive IGBTs, the current mostly being controlled by low-cost diodes and thyristors. The invention also provides support for regeneration, in which power generated by the load is returned to the AC mains.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 3:
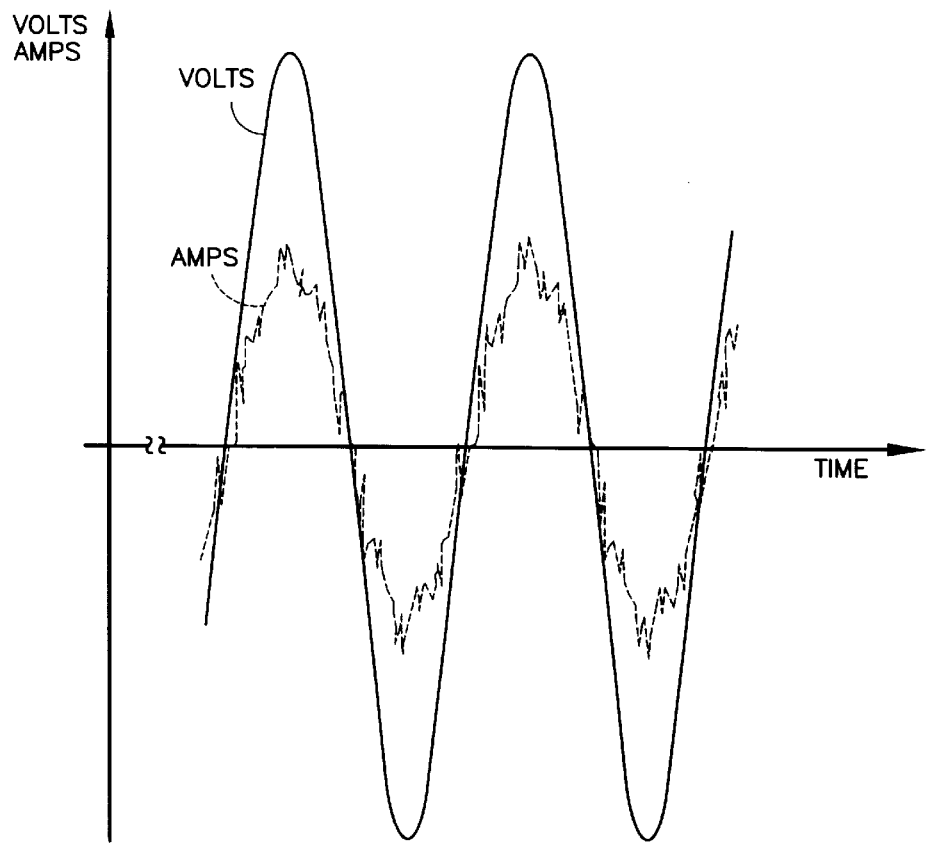
FIG. 3 is a plot of input current and voltage as a function of time for the invention of FIG. 1.

Referring to FIG. 3, the improvement of the present invention results in improving the quality of the AC input current as shown in FIG. 3. Although the waveform is still rather ragged, and there is still some harmonic content, the quality is above the standard set by recommended practices, which is sufficient for a low-cost converter circuit.

Figure 4:
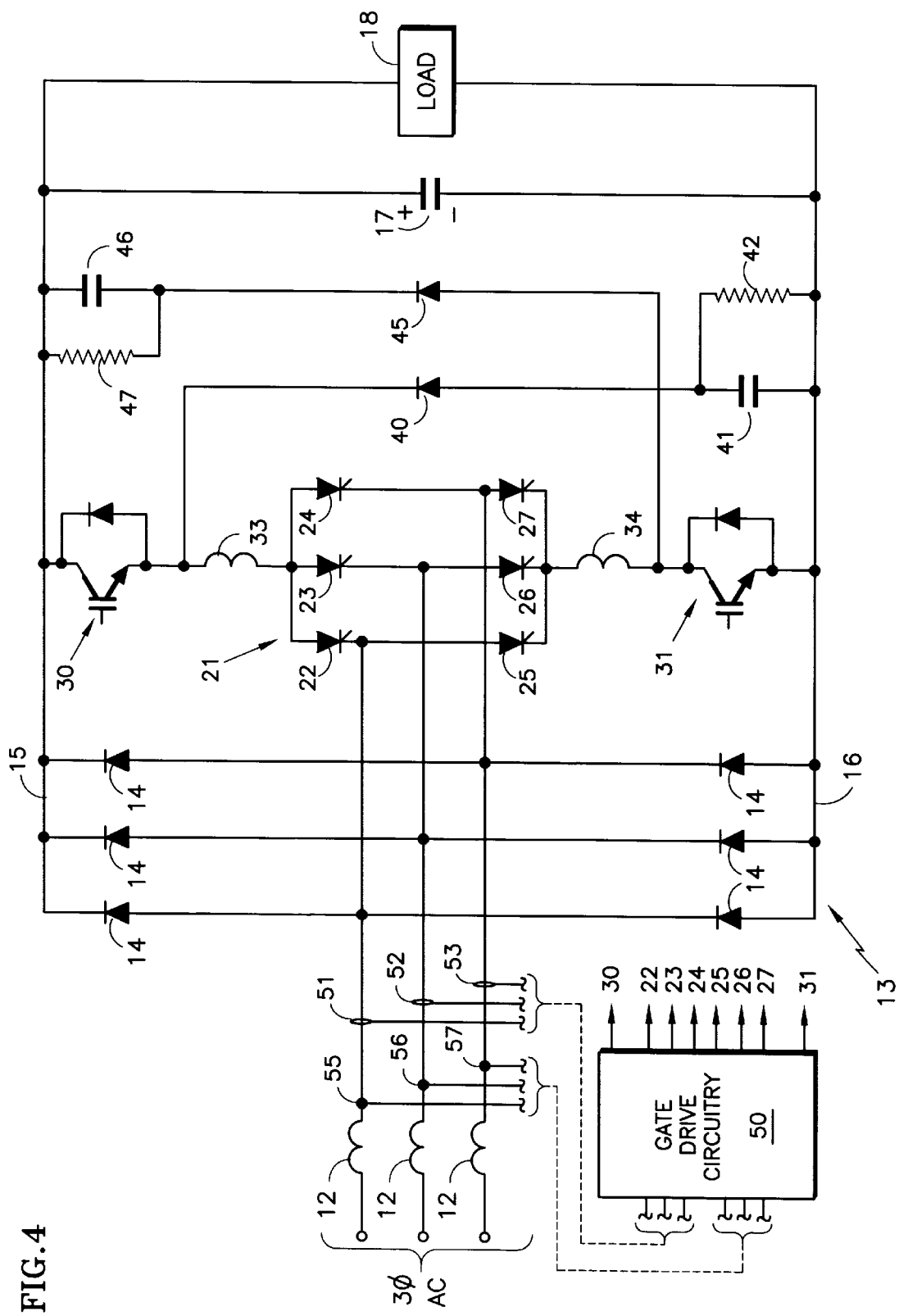
FIG. 4 is a schematic diagram of a hybrid AC/DC converter of the present invention.

In FIG. 4, the present invention is shown disposed between the diode bridge 13 and the capacitor bank 17. The main element of the invention is a bridge 21 comprised of six conventional thyristors, which may be silicon controlled rectifiers. The bridge 21, however, is allowed to conduct only through conventional IGBT/diode pairs 30, 31. Current rise through the thyristors 22–27 as they are turned on is limited by inductors 33, 34, to avoid thyristor failure. As is known, the thyristors 22–27 may be turned on by any conventional drive circuitry, which is appropriately controlled by a suitable control algorithm. Once each thyristor is conducting, the turn-on signal can be removed because the thyristor will continue to conduct until it is reversed biased. The present invention reverse biases the thyristors 22–24 by means of a thyristor turn-off circuit comprising a diode 40, a capacitor 41, and a resistor 42. Similarly, a thyristor turn-off circuit for thyristors 25–27 comprises a diode 45, a capacitor 46, and a resistor 47. Operation of the thyristor turn-off circuits is described hereinafter with respect to FIG. 5.

Figure 1:
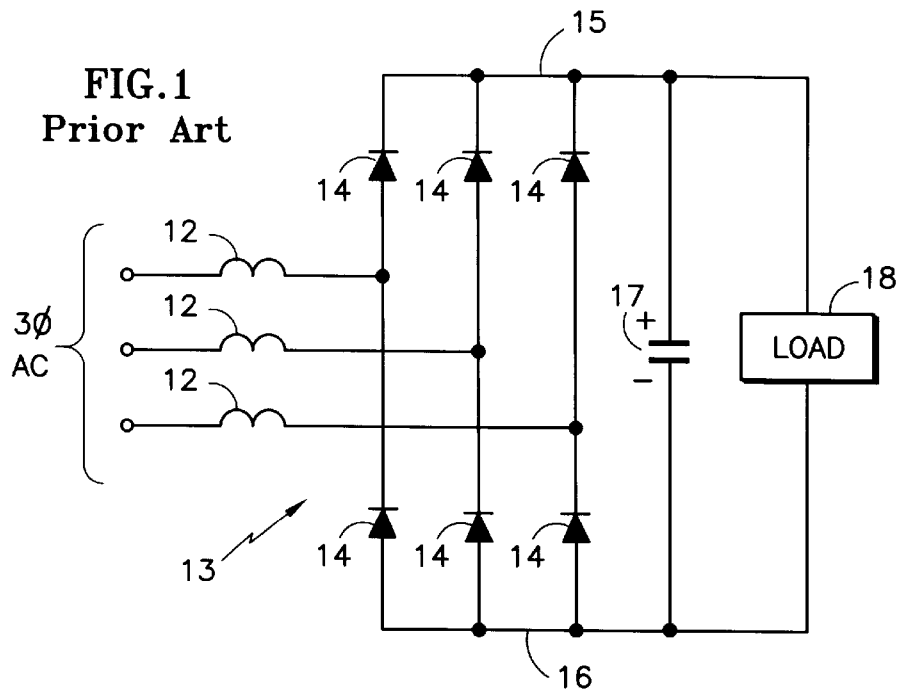
FIG. 1 is a schematic diagram of a diode bridge AC converter known to the prior art.
Figure 2:
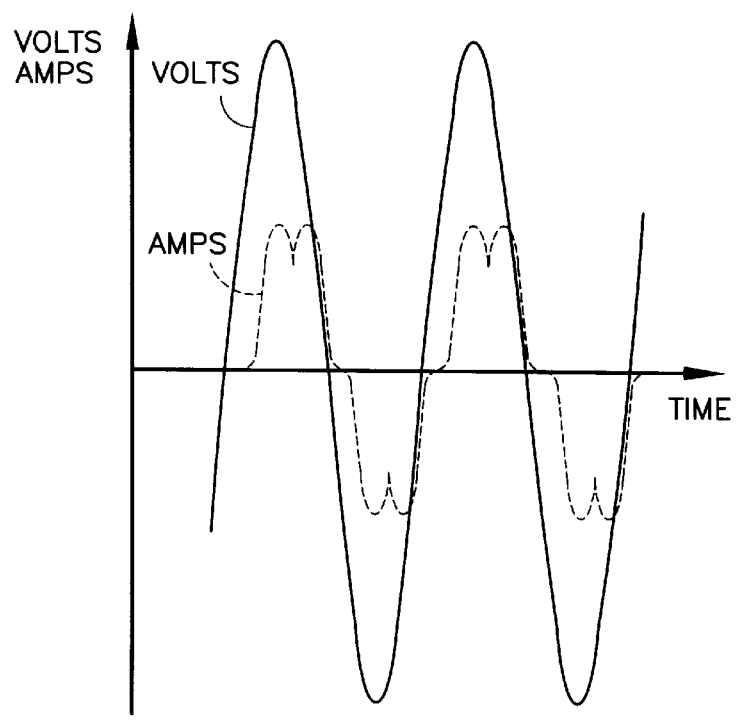
FIG. 2 is a plot of input current and voltage as a function of time for one phase of the device of FIG. 1.

The thyristors 22–27 and the corresponding IGBTs 30, 31 are operated in a manner so as to cause additional current flow with the AC mains so that the total current flow in each phase is acceptably close to a sinusoid to meet recommended practices for the quality of the input current or output current. Referring again to FIG. 2, it is obvious that if more current is drawn early in each half cycle, and just beyond midway of each half cycle, the current would more nearly approach a sinusoidal waveform, an example of which is shown in FIG. 3. The turn-on of the SCRs and the conduction of the IGBTs can be controlled, for instance, by a conventional hysteresis controller, of the type described in Section 7.3 of *Vector Control and Dynamics of AC Drives*, Novotny, D. W. et al, Oxford University Press, New York, N.Y. 1996. However, conventional gate drive circuitry of a wide variety, utilizing any number of suitable, conventional drive algorithms may be employed if desired.

Referring to FIG. 4, gate drive circuitry 50 responds to a plurality of conventional current sensors 51–53, each indicative of the input current (or the output current when the load is generating power, such as in the regeneration mode of an elevator) in each line, and responds to the voltage of each line at nodes 55, 56, 57. The gate drive circuitry 50 will provide signals to turn on one of the IGBTs 30, 31 commensurately with turning on either one of the thyristors 22–24 or one of the thyristors 25–27. Once a thyristor is on, its turn-on signal can be removed, whereas the signals controlling the IGBTs will stay on until the IGBT is to be turned off. In the case where a hysteresis controller is utilized to control the IGBTs and thyristors in the present invention, the gate drive circuitry 50 will turn on an appropriate set of IGBT and thyristor when the input current in any phase falls below (or exceeds) the range of permissible currents for the instantaneous value of corresponding input voltage at a related node 55–57, and will turn off the IGBT when the input current increases to where it exceeds (or falls below) the range of permissible input currents. Thus, the current hunts back and forth across the permissible band. The band can be made as tight as is desired, subject to the required turn-on and turn-off times for the IGBTs and thyristors.

Figure 5:
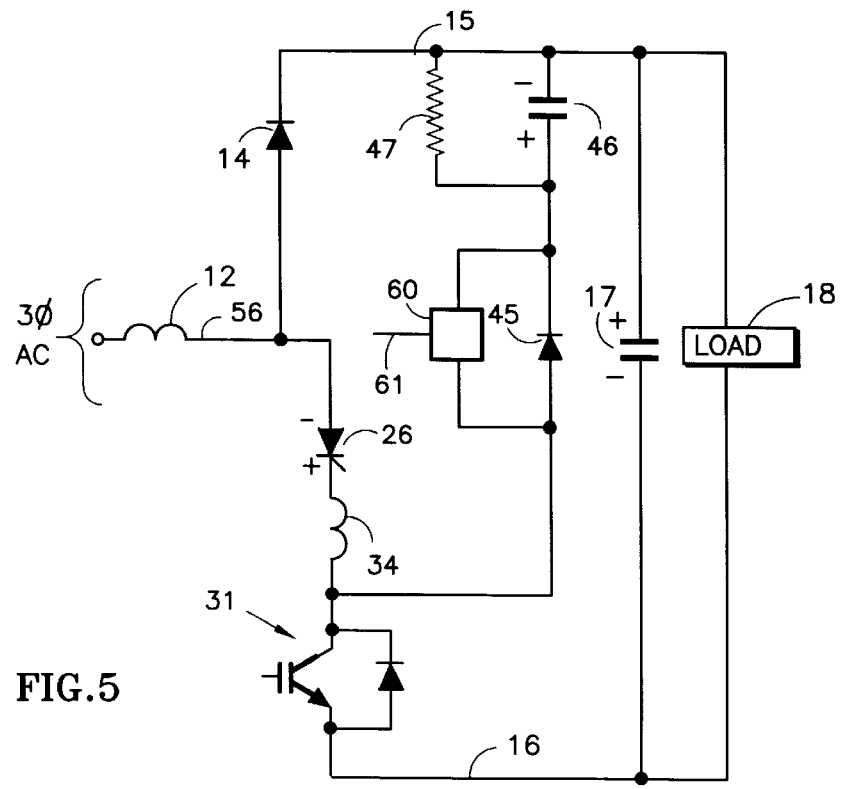
FIG. 5 is a partial schematic of the converter of FIG. 4.

Referring to FIG. 5, assume that the current in the middle input phase passing through the corresponding reactor 12 and diode 14 has been determined to be below the permissible band of current amplitude so that the gate drive circuitry 50 has previously turned on the IGBT 31 and the thyristor 26, and that the thyristor 26 has already had its turn-on signal removed. Now assume that the current exceeds the band of permissible currents for the input phase at the node 56. The conduction signal for the IGBT 31 will be removed so that current can no longer flow to the negative rail 16. This provides precise turn-off of the current flow between the AC main and the load and is a prime feature of the invention. The thyristor 26 is still on, so current flows from the AC main through the inductor 12, the thyristor 26, the inductor 34, and the diode 45, to charge the capacitor 46, positive to negative, as shown. Because the diodes 14 and 45 are both forward biased and are therefore short circuits, as the current decays in the inductor 34, the voltage across the capacitor 46 will build up minus to plus across the thyristor 26, as shown in FIG. 5, thereby providing reverse bias across the thyristor 26 so it will turn off. This is a principal aspect of the present invention. The voltage on the capacitor 46 then decays through the resistor 47.

FIG. 5 also illustrates an additional embodiment of the invention. As the forward-biasing voltage decays across the diode 45, should the diode 45 not remain conductive long enough so that the reverse bias on the thyristor causes a complete turn-off the thyristor, an additional element may be utilized in parallel with the diode 45 so as to ensure conduction between the capacitor 46 and the thyristor 26 for a sufficient time to cause the thyristor to turn completely off. Such an element might comprise a simple field effect transistor 60, the gate voltage of which on a line 61 will appear just as the on conduction signal for the IGBT 31 disappears, and remain on for the period of time necessary to ensure that the thyristor 26 will turn off. However, in many cases, the diode 45 will be adequate by itself.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A three-phase AC/DC regenerative converter, comprising:
    a six-diode bridge having three nodes, each connected through a corresponding input inductor to a corresponding line of a three-phase AC main; and
    a capacitor bank connected by a positive rail and a negative rail across said diode bridge for developing a DC voltage across said rails for application to a load;
    characterized by the improvement comprising:
    a six-thyristor bridge having three nodes, each connected through a corresponding one of said input inductors to a corresponding one of said lines, said thyristors poled for conduction with said AC mains in a direction opposite to that of said diodes;
    each side of said thyristor bridge connected to a corresponding one of said rails through a current limiting inductor and an IGBT having a reverse diode in parallel with it, said IGBTs poled for conduction with said AC mains in the same direction as said thyristors;
    a pair of thyristor turn-off circuits, each connected from a node between one of said IGBTs and a corresponding one of said limiting inductors to one of said rails other than the rail to which the corresponding IGBT is connected, each responsive to turn-off of the corresponding IGBT for reverse-biasing a thyristor conducting current through the corresponding limiting inductor; and
    a gate drive controller responsive to the voltage of each of said lines and to the current flowing in each of said lines for providing turn-on signals to said thyristors and conduction signals to said IGBTs so as to selectively conduct current through said thyristor bridge and said IGBTs in a manner to cause the current in said lines to more nearly approximate sinusoidal current.

2. A converter according to claim 1 wherein:
    said turn-off circuits each comprise a capacitor in series with a diode poled to conduct to said one rail.

3. A converter according to claim 2 further comprising:
    a resistor in parallel with said capacitor.

* * * * *